US011381838B2

(12) United States Patent
Lai et al.

(10) Patent No.: US 11,381,838 B2
(45) Date of Patent: Jul. 5, 2022

(54) METHOD AND APPARATUS OF IMPROVED MERGE WITH MOTION VECTOR DIFFERENCE FOR VIDEO CODING

(71) Applicant: MEDIATEK INC., Hsinchu (TW)

(72) Inventors: Chen-Yen Lai, Hsinchu (TW); Yu-Ling Hsiao, Hsinchu (TW); Tzu-Der Chuang, Hsinchu (TW); Ching-Yeh Chen, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

(21) Appl. No.: 17/293,674

(22) PCT Filed: Nov. 15, 2019

(86) PCT No.: PCT/CN2019/118840
§ 371 (c)(1),
(2) Date: May 13, 2021

(87) PCT Pub. No.: WO2020/098790
PCT Pub. Date: May 22, 2020

(65) Prior Publication Data
US 2021/0360284 A1 Nov. 18, 2021

Related U.S. Application Data

(60) Provisional application No. 62/822,869, filed on Mar. 23, 2019, provisional application No. 62/772,115, (Continued)

(51) Int. Cl.
*H04N 19/56* (2014.01)
*H04N 19/172* (2014.01)
*H04N 19/176* (2014.01)

(52) U.S. Cl.
CPC ........... *H04N 19/56* (2014.11); *H04N 19/172* (2014.11); *H04N 19/176* (2014.11)

(58) Field of Classification Search
CPC ..... H04N 19/172; H04N 19/176; H04N 19/56
See application file for complete search history.

(56) References Cited

U.S. PATENT DOCUMENTS

| 9,426,463 B2 | 8/2016 | Seregin et al. |
| 10,182,240 B2 | 1/2019 | Hsu |
| (Continued) |

FOREIGN PATENT DOCUMENTS

| CN | 104160704 A | 11/2014 |
| CN | 107113424 A | 8/2017 |
| (Continued) |

OTHER PUBLICATIONS

International Search Report and Written Opinion dated Feb. 7, 2020, issued in application No. PCT/CN2019/118840.
(Continued)

*Primary Examiner* — Jessica M Prince
(74) *Attorney, Agent, or Firm* — McClure, Qualey & Rodack, LLP

(57) ABSTRACT

A prediction method and apparatus for video coding include a set of Merge candidates having an MMVD (Merge mode with motion vector differences (MVD)) candidate are generated. When the current block has a block size belonging to at least one default block size, whether a target candidate in the set of Merge candidates is bi-prediction is determined after the set of Merge candidates is generated. If the target candidate is bi-prediction: the target candidate is replaced by a uni-prediction candidate; the uni-prediction candidate is included in the set of Merge candidates to generate a modified set of Merge candidates; and current motion information associated with the current block is encoded using
(Continued)

the modified set of Merge candidates at the video encoder side or the current motion information associated with the current block is decoded at the video decoder side using the modified set of Merge candidates.

9 Claims, 7 Drawing Sheets

Related U.S. Application Data filed on Nov. 28, 2018, provisional application No. 62/768,207, filed on Nov. 16, 2018.

(56) References Cited

U.S. PATENT DOCUMENTS

| 10,575,011 | B2 | 2/2020 | Park et al. | |
| 11,146,793 | B2* | 10/2021 | Lee | H04N 19/52 |
| 2017/0310990 | A1* | 10/2017 | Hsu | H04N 19/577 |
| 2020/0077106 | A1* | 5/2020 | Jhu | H04N 19/44 |
| 2020/0244968 | A1* | 7/2020 | Jun | H04N 19/176 |
| 2021/0029372 | A1* | 1/2021 | Zhang | H04N 19/1883 |

FOREIGN PATENT DOCUMENTS

| CN | 108141588 A | 6/2018 |
| EP | 3 343 924 A1 | 7/2018 |
| TW | 201739252 A | 11/2017 |
| WO | 2013/070757 A1 | 5/2013 |
| WO | 2017/156705 A1 | 9/2017 |

OTHER PUBLICATIONS

Lai, C.Y., et al.; "CE4-related: MMVD cleanups;" Joint Video Experts Team (JVET) of ITU-T SG 16 WP 3 and ISO/IEC JTC 1/SC 29/WG 11; Jan. 2019; pp. 1-242.
Chen, Y.W., et al.; "AHG5: Reducing WC worst-case memory bandwidth by restricting bi-directional 4x4 inter CUs/Sub-blocks;" Joint Video Experts Team (JVET) of ITU-T SG 16 WP 3 and ISO/IEC JTC 1/SC 29/WG 11; Oct. 2018; pp. 1-61.
Hashimoto, T., et al.; "Non-CE4: Enhanced ultimate motion vector expression;" Joint Video Exploration Team (JVET) of ITU-T SG 16 WP 3 and ISO/IEC JTC 1/SC 29/WG 11; Oct. 2018; pp. 1-110.
Hsu, C.W., et al.; "Description of Core Experiment 10: Combined and multi-hypothesis prediction;" Joint Video Experts Team (JVET) of ITU-T SG 16 WP 3 and ISO/IEC JTC 1/SC 29/WG 11; Oct. 2018; pp. 1-36.
Chinese language office action dated Feb. 8, 2021, issued in application No. TW 108141601.
Fukushima, S., et al.; "Merge based mvd transmission;" Joint Collaborative Team on Video Coding (JCT-VC) of ITU-T SG16 WP3 and ISO/IEC JTC1/SC29/WG11; Jul. 2011; pp. 1-39.
Chinese language office action dated Dec. 3, 2021, issued in application No. CN 201980074815.5.
Jeong, S., et al.; "CE4 Ultimate motion vector expression in J0024 (Test 4.2.9);" Joint Video Experts Team (JVET) of ITU-T SG 16 WP 3 and ISO/IEC JTC 1/SC 29/WG 11; Jul. 2018; pp. 1-6.

* cited by examiner

METHOD AND APPARATUS OF IMPROVED MERGE WITH MOTION VECTOR DIFFERENCE FOR VIDEO CODING

CROSS REFERENCE TO RELATED APPLICATIONS

The present invention claims priority to U.S. Provisional Patent Application, Ser. No. 62/768,207, filed on Nov. 16, 2018, U.S. Provisional Patent Application, Ser. No. 62/772,115, filed on Nov. 28, 2018 and U.S. Provisional Patent Application, Ser. No. 62/822,869, filed on Mar. 23, 2019. The U.S. Provisional Patent Applications are hereby incorporated by reference in their entireties.

FIELD OF THE INVENTION

The present invention relates to Inter or Inter/Intraprediction for video coding using MMVD (Merge with Motion Vector Difference). In particular, the present invention discloses various methods to reduce the complexity of MMVD and/or to improve the performance.

BACKGROUND AND RELATED ART

High-Efficiency Video Coding (HEVC) is a new international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block, and each CU can be recursively split into four smaller CUs until the predefined minimum size is reached. Each CU contains one or multiple prediction units (PUs).

To achieve the best coding efficiency of hybrid coding architecture in HEVC, there are two kinds of prediction modes (i.e., Intra prediction and Inter prediction) for each PU. For Intra prediction modes, the spatial neighbouring reconstructed pixels can be used to generate the directional predictions. For Inter prediction modes, the temporal reconstructed reference frames can be used to generate motion compensated predictions. There are various coding tools for coding motion information, including Skip, Merge and Inter Advanced Motion Vector Prediction (AMVP) modes.

Current Picture Referencing

Motion estimation/compensation is a well-known key technology in hybrid video coding, which explores the pixel correlation between adjacent pictures. In a video sequence, the object movement between neighbouring frames is small and the object movement can be modelled by two-dimensional translational motion. Accordingly, the patterns corresponding to objects or background in a frame are displaced to form corresponding objects in the subsequent frame or correlated with other patterns within the current frame. With the estimation of a displacement (e.g. using block matching techniques), the pattern can be mostly reproduced without the need to re-code the pattern. Similarly, block matching and copy has also been tried to allow selecting the reference block from within the same picture. It was observed to be not efficient when applying this concept to videos captured by a camera. Part of the reasons is that the textual pattern in a spatial neighbouring area may be similar to the current coding block, but usually with some gradual changes over space. It is thus difficult for a block to find an exact match within the same picture of video captured by a camera. Therefore, the improvement in coding performance is limited.

However, the spatial correlation among pixels within the same picture is different for screen content. For typical video with text and graphics, there are usually repetitive patterns within the same picture. Hence, Intra (picture) block compensation has been observed to be very effective. A new prediction mode, i.e., the Intra block copy (IBC) mode or called current picture referencing (CPR), has been introduced for screen content coding to utilize this characteristic. In the CPR mode, a prediction unit (PU) is predicted from a previously reconstructed block within the same picture. Further, a displacement vector (called block vector or BV) is used to signal the relative displacement from the position of the current block to the position of the reference block. The prediction errors are then coded using transformation, quantization and entropy coding. An example of CPR compensation is illustrated in FIG. 1, where area 110 corresponds to a picture, a slice or a picture area to be coded. Blocks 120 and 130 correspond to two blocks to be coded. In this example, each block can find a corresponding block in the previous coded area in the current picture (i.e., 122 and 132 respectively). According to this technique, the reference samples correspond to the reconstructed samples of the current decoded picture prior to in-loop filter operations including both deblocking and sample adaptive offset (SAO) filters in HEVC.

An early version of CPR was disclosed in JCTVC-M0350 (Madhukar Budagavi, et al, "AHG8: Video coding using Intra motion compensation", Joint Collaborative Team on Video Coding (JCT-VC) of ITU-T SG 16 WP 3 and ISO/IEC JTC 1/SC 29/WG 11, 13th Meeting: Incheon, KR, 18-26 Apr. 2013, Document: JCTVC-M0350), which is submitted as a candidate technology for HEVC Range Extensions (REst) development. In JCTVC-M0350, the CPR compensation was limited to be within a small local area and the search is limited to 1-D block vector for the block size of 2N×2N only. Later, a more advanced CPR method was developed during the standardization of HEVC SCC (screen content coding).

In order to signal the block vector (BV) efficiently, the BV is signalled predictively using a BV predictor (BVP) in a similar fashion as the MV coding. Accordingly, the BV difference (BVD) is signalled and the BV can be reconstructed according to BV=BVP+BVD as shown in FIG. 2, where reference block 220 is selected as IntraBC prediction for the current block 210 (i.e., a CU). A BVP is determined for the current CU. Methods to derive the motion vector predictor (MVP) is known in the field. Similar derivation can be applied to BVP derivation.

In JCTVC-M0350, the Intra MC is different from the motion compensation used for Inter prediction in at least the following areas:
  MVs are restricted to be 1-D for Intra MC (i.e., either horizontal or vertical) while Inter prediction uses 2-D motion estimation.
  Binarization is fixed length for Intra MC while Inter prediction uses exponential-Golomb.
  Intra MC introduces a new syntax element to signal whether the MV is horizontal or vertical.

Based on JCTVC-M0350, some modifications are disclosed by Pang, et al. in Non-RCE3: *Intra Motion Compensation with 2-D MVs*, Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013, Document: JCTVC-N0256 (hereinafter JCTVC-N0256). Firstly, the Intra MC is extended to support 2-D MVs, so that both MV components can be non-zero at the same time. This provides more flexibility to Intra MC than the original approach, where the MV is restricted to be strictly horizontal or vertical.

Several MV coding methods were tested:

Method 1: The left or above MV is selected as the MV predictor and the resulting MVD is coded. First, one flag indicates whether the MVD is zero. When MVD is not zero, an exponential-Golomb of 3rd order codes the remaining absolute level of the MVD and a flag codes its sign.

Method 2: No predictor is used and the MV is coded using the exponential-Golomb codes used for MVD coding in HEVC.

Method 3: the MV from last coded IntraBC PU is used as the predictor for the MV of current IntraBC PU. Note that this method is adopted in the current RExt text draft.

Thirdly, the 2-D Intra MC is combined with the pipeline friendly approach proposed in JCTVC-N0256:
1. No interpolation filters are used
2. MV search area is restricted. Two cases are analyzed:
   a. Search area is the current CTU and the left CTU or
   b. Search area is the current CTU and the rightmost 4 columns of the left CTU.

Among the proposed methods in JCTVC-N0256, the 2-D intra MC was adopted, the removal of interpolation filters was adopted, and the search area constraint to the current CTU and the left CTU was adopted. Other aspects were either turned down or suggested for further study.

Here is a brief summary of Spatial AMVP prediction that is proposed in JCTVC-O0218 (L. Guo, M. Karczewicz, J. Sole, and R. Joshi, "Evaluation of Palette Mode Coding on HM-12.0+REext-4.1", JCTVC-O0218, Geneva, CH, October 2013).

In FIG. 3, a number of possible block vector candidates (as numbered from 0 to 6) in previously coded neighbouring block positions are shown. In Table 1, these positions are described in details:

TABLE 1

| Position | Description |
|---|---|
| 0 | below left position of the bottom left corner of the current block |
| 1 | left position of the bottom left corner of the current block |
| 2 | above right position of the top right corner of the current block |
| 3 | above position of the top right corner of the current block |
| 4 | above left position of the top left corner of the current block |
| 5 | left position of the top left corner of the current block |
| 6 | above position of the top left corner of the current block |

When CPR is used, only part of the current picture can be used as the reference picture. Some bitstream conformance constraints are imposed to regulate the valid MV value referring to the current picture.

First, one of the following two equations must be true:

$$BV\_x + offsetX + nPbSw + xPbs - xCbs <= 0, \text{ and} \quad (1)$$

$$BV\_y + offsetY + nPbSh + yPbs - yCbs <= 0 \quad (2)$$

Second, the following WPP (Wavefront Parallel Processing) condition must be true:

$$(xPbs + BV\_x + offsetX + nPbSw - 1)/CtbSizeY - xCbs/CtbSizeY <= yCbs/CtbSizeY - (yPbs + BV\_y + offsetY + nPbSh - 1)/CtbSizeY \quad (3)$$

In equations (1) through (3), (BV_x, BV_y) is the luma block vector (i.e., the motion vector for CPR) for the current PU; nPbSw and nPbSh are the width and height of the current PU; (xPbS, yPbs) is the location of the top-left pixel of the current PU relative to the current picture; (xCbs, yCbs) is the location of the top-left pixel of the current CU relative to the current picture; and CtbSizeY is the size of the CTU. OffsetX and offsetY are two adjusted offsets in two dimensions in consideration of chroma sample interpolation for the CPR mode:

$$offsetX = BVC\_x \& 0x7?2:0, \quad (4)$$

$$offsetY = BVC\_y \& 0x7?2:0. \quad (5)$$

(BVC_x, BVC_y) is the chroma block vector, in ⅛-pel resolution in HEVC.

Third, the reference block for CPR must be within the same tile/slice boundary.

When a PU is coded in Inter AMVP mode, motion-compensated prediction is performed with transmitted motion vector differences (MVDs) that can be used together with Motion Vector Predictors (MVPs) for deriving motion vectors (MVs). To decide MVP in Inter AMVP mode, the advanced motion vector prediction (AMVP) scheme is used to select a motion vector predictor among an AMVP candidate set including two spatial MVPs and one temporal MVP. So, in AMVP mode, MVP index for MVP and the corresponding MVDs are required to be encoded and transmitted. In addition, the Inter prediction direction to specify the prediction directions among bi-prediction, and uni-prediction which are list 0 (i.e., L0) and list 1 (i.e., L1), accompanied with the reference frame index for each list should also be encoded and transmitted.

In HEVC, in addition to the spatial AMVP prediction, temporal MV predictor is also used for Inter-slice motion compensation. As shown in FIG. 4, a temporal predictor is derived from a block ($T_{BR}$ or $T_{CTR}$) located in a co-located picture where the co-located picture is the first reference picture in reference list 0 or reference list 1. Since the block where a temporal MVP is located may have two MVs, one MV from reference list 0 and one MV from reference list 1, the temporal MVP is derived from the MV from reference list 0 or reference list 1 according to the following rule:
1. The MV that crosses the current picture is chosen first.
2. If both MVs cross the current picture or both do not cross, the one with same reference list as the current list will be chosen.

Merge with MVD Mode (MMVD) Technique

In JVET-K0115 (S. Jeong, et al., "CE4 Ultimate motion vector expression in J0024 (Test 4.2.9)", in Joint Video Exploration Team (JVET) of ITU-T SG 16 WP 3 and ISO/IEC JTC 1/SC 29/WG 11, 11th Meeting: Ljubljana, SI, 10-18 Jul. 2018, Document: JVET-K0115), ultimate motion vector expression (UMVE) proposed in JVET-J0024 (S. Akula, et. Al., "Description of SDR, HDR and 360° video coding technology proposal considering mobile application scenario by Samsung, Huawei, GoPro, and HiSilicon", in Joint Video Exploration Team (JVET) of ITU-T SG 16 WP 3 and ISO/IEC JTC 1/SC 29/WG 11, 10th Meeting: San Diego, US, 10-20 Apr. 2018, Document: JVET-J0024) is presented. FIG. 5A illustrates an example of UMVE search process for a current block 512 in the current frame 510. Frame 520 in reference list L0 and frame 530 in reference list L1 correspond to the two references for bi-prediction. Line 540 corresponds to a line through the centre of the current block 512 and two corresponding pixels in frames 520 and 530. The search is performed around the centre points associated with line 540 (e.g. lines 542 and 544). In order to simplify the search process, only specific locations around the centre point vertically and horizontally will be searched as shown in FIG. 5B for L0 reference (550) and L1 reference (552). UMVE is used for either Skip or Merge modes with a proposed motion vector expression method. UMVE re-uses the same Merge candidate as VVC (Versatile Video Coding) standard being developed. Among the Merge candidates, a candidate can be selected, and is further expanded by the proposed motion vector expression method. UMVE provides a new motion vector expression with simplified signalling. The expression method includes prediction direction information, starting point, motion magnitude, and motion direction.

This technique uses a Merge candidate list as is. However, only candidates that are default Merge type (MRG_TYPE_DEFAULT_N) are considered for UMVE's expansion. Prediction direction information indicates a prediction direction among L0, L1, and L0 and L1 predictions. In B slice, the proposed method can generate bi-prediction candidates from Merge candidates with uni-prediction by using mirroring technique. For example, if a Merge candidate is uni-prediction with L1, a reference index of L0 is decided by searching a reference picture in list 0, which is mirrored with the reference picture for list 1. If there is no corresponding picture, the nearest reference picture to the current picture is used. The MV of L0 is derived by scaling MV of L1. The scaling factor is calculated by POC (picture order count) distance.

If the prediction direction of the UMVE candidate is the same as one of the original Merge candidate, the index with value 0 is signalled as an UMVE prediction direction. However, if the prediction direction of the UMVE candidate is not the same as one of the original Merge candidate, the index with value 1 is signalled. After signalling the first bit, remaining prediction direction is signalled based on the pre-defined priority order of UMVE prediction direction. Priority order is L0/L1 prediction, L0 prediction and L1 prediction. If the prediction direction of Merge candidate is L1, Code '0' is signalled for UMVE' prediction direction L1. Code '10' is signalled for UMVE' prediction direction L0 and L1. Code '11' is signalled for UMVE' prediction direction L0. If L0 and L1 prediction lists are the same, UMVE's prediction direction information is not signalled.

Base candidate index defines the starting point. Base candidate index indicates the best candidate among candidates in the list as shown in Table 2.

TABLE 2

| Base candidate IDX | | | |
|---|---|---|---|
| 0 | 1 | 2 | 3 |

The distance indices for various distances are shown in Table 3.

TABLE 3

| Distance IDX | | | | | | | |
|---|---|---|---|---|---|---|---|
| 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

Direction index represents the direction of the MVD relative to the starting point. The direction index can represent of the four directions as shown in Table 4.

TABLE 4

| | Direction IDX | | | |
|---|---|---|---|---|
| | 00 | 01 | 10 | 11 |
| x-axis | + | − | N/A | N/A |
| y-axis | N/A | N/A | + | − |

To reduce the encoder complexity, block restriction is applied. If either width or height of a CU is less than 4, UMVE is not performed.

Multi-Hypothesis Prediction(MH) Technique

Multi-hypothesis prediction is proposed to improve the existing prediction modes in Inter pictures, including uni-prediction of advanced motion vector prediction (AMVP) mode, Skip and Merge mode, and Intra mode. The general concept is to combine an existing prediction mode with an extra merge indexed prediction. The merge indexed prediction is performed as in Merge mode, where a merge index is signalled to acquire motion information for the motion compensated prediction. The final prediction is the weighted average of the Merge indexed prediction and the prediction generated by the existing prediction mode, where different weights are applied depending on the combinations. Detail information can be found in JVET-K1030 (C. Hsu, et al., "Description of Core Experiment 10: Combined and multi-hypothesis prediction", in Joint Video Exploration Team (JVET) of ITU-T SG 16 WP 3 and ISO/IEC JTC 1/SC 29/WG 11, 11th Meeting: Ljubljana, SI, 10-18 Jul. 2018, Document: JVET-K01030), or JVET-L0100 (M. Chiang, et al., "CE10.1.1: Multi-hypothesis prediction for improving AMVP mode, skip or merge mode, and intra mode", in Joint Video Exploration Team (JVET) of ITU-T SG 16 WP 3 and ISO/IEC JTC 1/SC 29/WG 11, 12th Meeting: Macao, CN, 3-12 Oct. 2018, Document: JVET-L0100).

Triangular Prediction Unit Mode Technique

The concept of the triangular prediction unit mode is to introduce a triangular partition for motion compensated prediction. As shown in FIG. 6, it splits a CU into two triangular prediction units, in either diagonal 610 or inverse diagonal direction 620. Each triangular prediction unit in the CU is inter-predicted using its own uni-prediction motion vector and reference frame index which are derived from a uni-prediction candidate list. An adaptive weighting process is performed to the diagonal edge after predicting the triangular prediction units. Then, the transform and quantization process are applied to the whole CU. It is noted that this mode is only applied to Skip and Merge modes.

Uni-Prediction Candidate List

The uni-prediction candidate list consists of five uni-prediction motion vector candidates. It is derived from seven neighboring blocks including five spatial neighboring blocks (1 to 5) and two temporal co-located blocks (6 to 7), as shown in FIG. 7. The motion vectors of the seven neighboring blocks are collected and put into the uni-prediction candidate list according in the order of uni-prediction motion vectors, L0 motion vector of bi-prediction motion vectors, L1 motion vector of bi-prediction motion vectors, and averaged motion vector of the L0 and L1 motion vectors of bi-prediction motion vectors. If the number of candidates is less than five, zero motion vector is added to the list.

Adaptive Weighting Process

After predicting each triangular prediction unit, an adaptive weighting process is applied to the diagonal edge between the two triangular prediction units to derive the final prediction for the whole CU. Two weighting factor groups are listed as follows:

1st weighting factor group: {7/8, 6/8, 4/8, 2/8, 1/8} and {7/8, 4/8, 1/8} is used for the luminance and the chrominance samples, respectively;

2nd weighting factor group: {7/8, 6/8, 5/8, 4/8, 3/8, 2/8, 1/8} and {6/8, 4/8, 2/8} are used for the luminance and the chrominance samples, respectively.

One weighting factor group is selected based on the comparison of the motion vectors of two triangular prediction units. The 2nd weighting factor group is used when the reference pictures of the two triangular prediction units are different from each other or their motion vector difference is larger than 16 pixels. Otherwise, the 1st weighting factor group is used. An example is shown in FIG. 8, where weighting 810 is shown for the luma block and weighting 820 is shown for the chroma block.

Motion Vector Storage

The motion vectors (Mv1 and Mv2 in FIG. 9) of the triangular prediction units are stored in 4×4 grids for diagonal partition 910 and inverse diagonal partition 920. For each 4×4 grid, either uni-prediction or bi-prediction motion vector is stored depending on the position of the 4×4 grid in the CU. As shown in FIG. 9, uni-prediction motion vector, either Mv1 or Mv2, is stored for the 4×4 grid located in the non-weighted area. On the other hand, a bi-prediction motion vector is stored for the 4×4 grid located in the weighted area. The bi-prediction motion vector is derived from Mv1 and Mv2 according to the following rules:

1. In the case that Mv1 and Mv2 have motion vector from different directions (L0 or L1), Mv1 and Mv2 are simply combined to form the bi-prediction motion vector.

2. In the case that both Mv1 and Mv2 are from the same L0 (or L1) direction,
   a. If the reference picture of Mv2 is the same as a picture in the L1 (or L0) reference picture list, Mv2 is scaled to the picture. Mv1 and the scaled Mv2 are combined to form the bi-prediction motion vector.
   b. If the reference picture of Mv1 is the same as a picture in the L1 (or L0) reference picture list, Mv1 is scaled to the picture. The scaled Mv1 and Mv2 are combined to form the bi-prediction motion vector.
   c. Otherwise, only Mv1 is stored for the weighted area.

An illustration of the derivation of bi-prediction motion vector is shown in FIG. 10A-FIG. 10D according to JVET-L0124 (H. Yang, et al., "Description of Core Experiment 4 (CE4): Inter prediction and motion vector coding", in Joint Video Exploration Team (JVET) of ITU-T SG 16 WP 3 and ISO/IEC JTC 1/SC 29/WG 11, 12th Meeting: Macao, CN, 3-12 Oct. 2018, Document: JVET-L1024). In FIG. 10A-FIG. 10D, the current picture corresponds to POC 4, the reference picture list 0 (L0) comprises POC 0 and POC 8, and the reference picture list 1 (L1) comprises POC 8 and POC16. In FIG. 10A, the bi-prediction MV corresponds to ((L0 refIdx=0, Mv1), (L1 refIdx=0, Mv2)). In FIG. 10B, the bi-prediction MV corresponds to ((L0 refIdx=0, Mv1), (L1 refIdx=0, Mv2)). In FIG. 10C, the bi-prediction MV corresponds to ((L0 refIdx=1, Mv1), (L1 refIdx=1, Mv2)). In FIG. 10D, only Mv1 is stored for the weighted area.

Syntax

The triangular prediction unit mode is only applied to CUs in skip or merge mode. Besides, the block size of the CUs cannot be smaller than 8×8. For a CU coded in a skip or merge mode, a CU level flag is signalled to indicate whether the triangular prediction unit mode is applied or not for the current CU. When the triangular prediction unit mode is applied to the CU, an index indicating the direction for splitting the CU into two triangular prediction units and the motion vectors of the two triangular prediction units are signalled. The index ranges from 0 to 39. A look-up table is used for deriving the splitting direction and motion vectors from the index.

BRIEF SUMMARY OF THE INVENTION

A method and apparatus of prediction for video coding are disclosed. According to this method, input data related to a current block in a current picture is received at a video encoder side or a video bitstream corresponding to compressed data including the current block in the current picture is received at a video decoder side. A set of Merge candidates comprising an MMVD (Merge mode with motion vector differences (MVD)) candidate are generated, where the MMVD candidate is derived by determining a base candidate and modifying one or more parts of MV (Motion Vector) expression of the base candidate to generate the MMVD candidate. When the current block has a block size belonging to at least one default block size, whether a target candidate in the set of Merge candidates is bi-prediction is determined after the set of Merge candidates is generated. The at least one default block size may comprise 4×4. If the target candidate is bi-prediction: the target candidate is replaced by a uni-prediction candidate; the uni-prediction candidate is included in the set of Merge candidates to generate a modified set of Merge candidates; and current motion information associated with the current block is encoded using the modified set of Merge candidates at the video encoder side or the current motion information associated with the current block is decoded at the video decoder side using the modified set of Merge candidates.

The set of Merge candidates further comprises a normal Merge candidate or a pairwise average Merge candidate. In some other embodiments, the set of Merge candidates may further comprises a history-based Merge candidate.

In one embodiment, the base candidate is only selected from first Merge candidates in the set of Merge candidates with a default Merge type. If none of the set of Merge candidates has the default Merge type, a default MV is included in the modified set of Merge candidates. In one embodiment, the default MV is referred from a reference picture in reference picture List 0.

In one embodiment, the one or more parts of MV expression comprise prediction direction information, starting point, motion magnitude, motion direction, or a combination thereof associated with the MV expression.

DETAILED DESCRIPTION OF THE INVENTION

Figure 1:
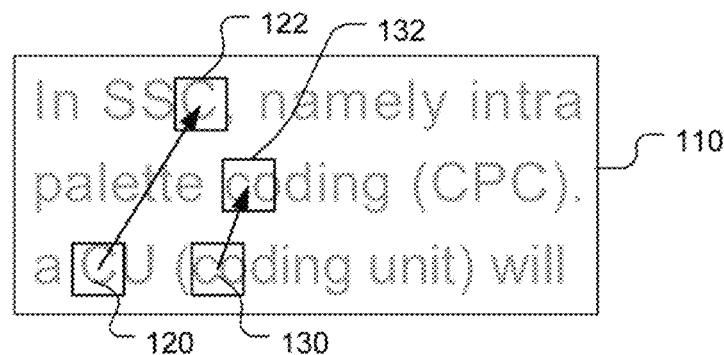
FIG. 1 illustrates an example of CPR (current picture referencing) compensation, where two blocks are predicted by another two blocks in the same picture.
Figure 2:
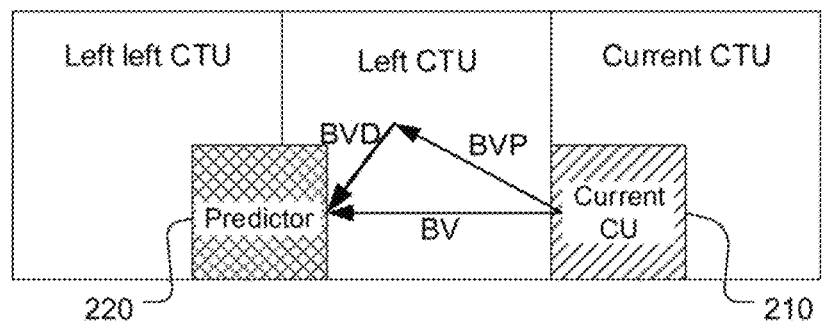
FIG. 2 illustrates an example of signalling the block vector (BV) predictively using a BV predictor (BVP) in a similar fashion as the MV coding.
Figure 3:
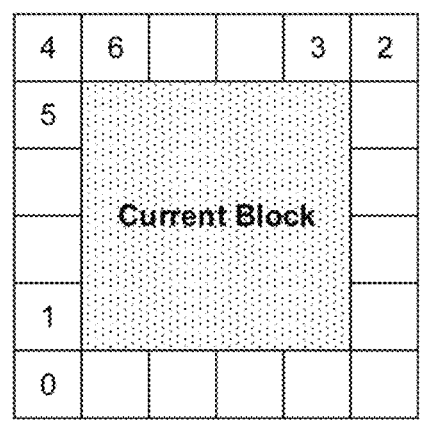
FIG. 3 illustrates an example of possible block vector candidates (as numbered from 0 to 6) in previously coded neighbouring block positions.
Figure 4:
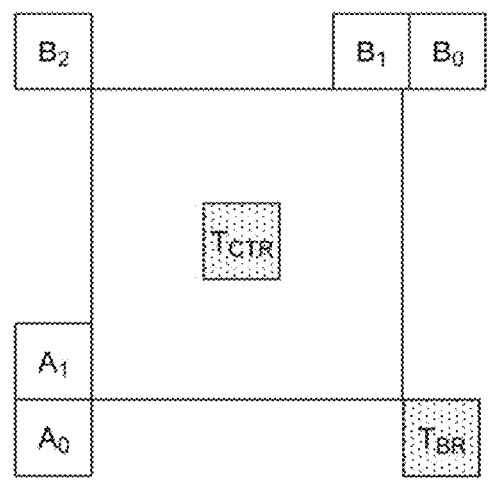
FIG. 4 illustrates the spatial and temporal MV predictors used for Inter-slice motion compensation.
Figure 5A:
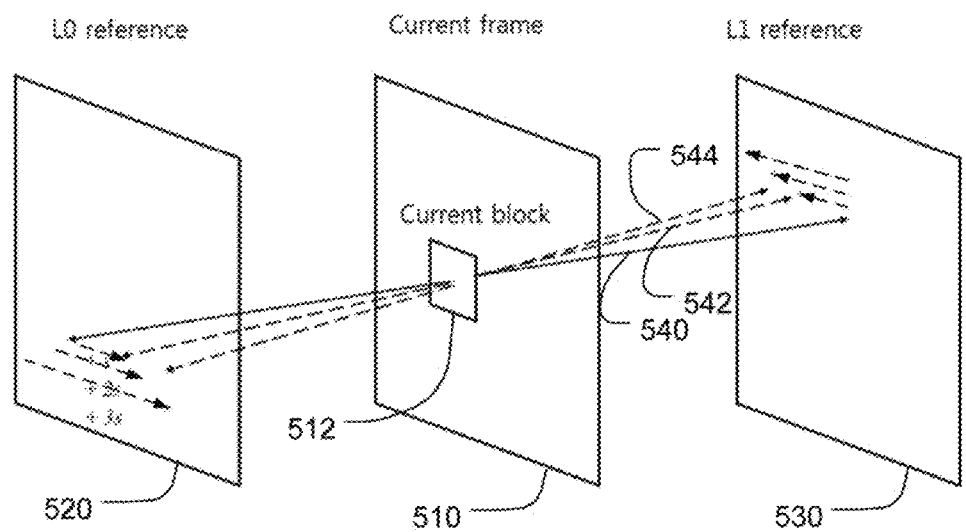
FIG. 5A illustrates an example of UMVE (ultimate motion vector expression) search process for a current block, where two reference pictures are used for bi-prediction.
Figure 5B:
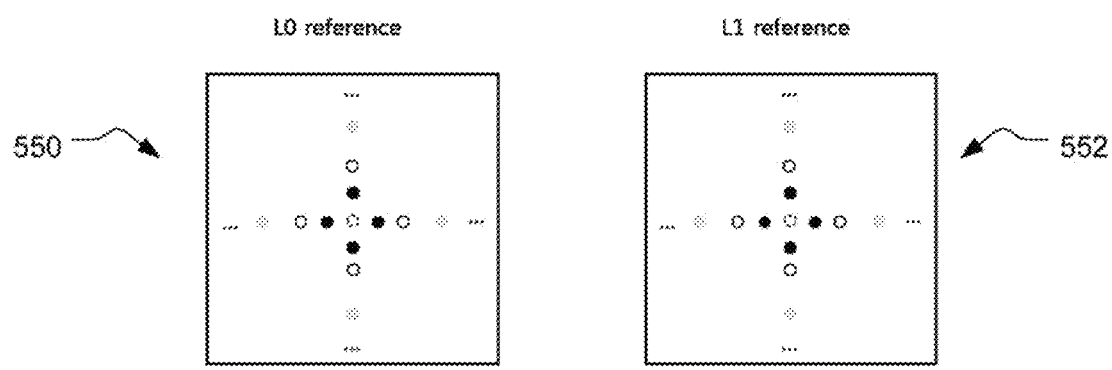
FIG. 5B illustrates an example of simplified UMVE, where only specific locations around the centre point vertically and horizontally will be searched in order to simplify the search process.
Figure 6:
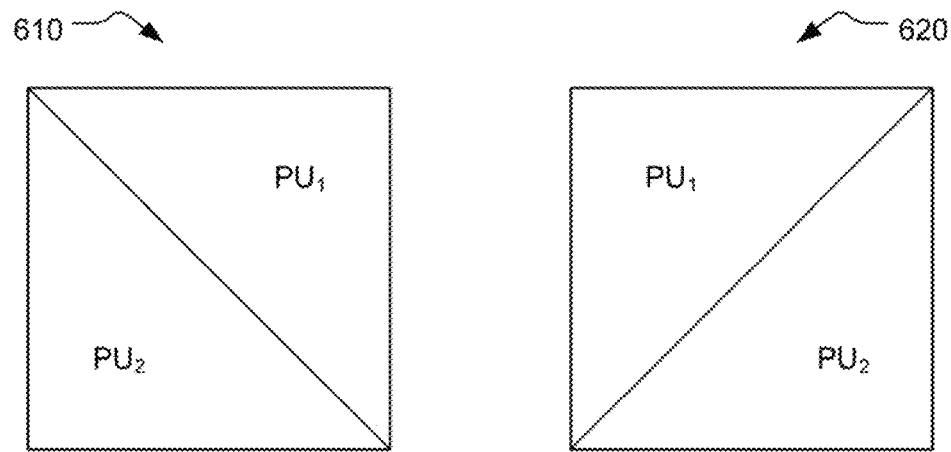
FIG. 6 illustrates an example of triangular partition mode, where a CU is partitioned into two triangular prediction units, in either diagonal or inverse diagonal direction.
Figure 7:
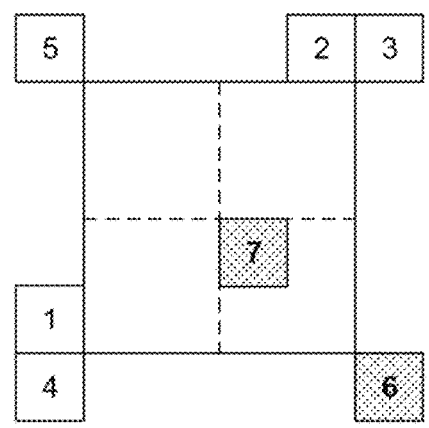
FIG. 7 illustrates an example of uni-prediction candidate list consisting of five uni-prediction motion vector candidates from 5 spatial neighbouring blocks (1 to 5) and two temporal co-located blocks (6 to 7).
Figure 8:
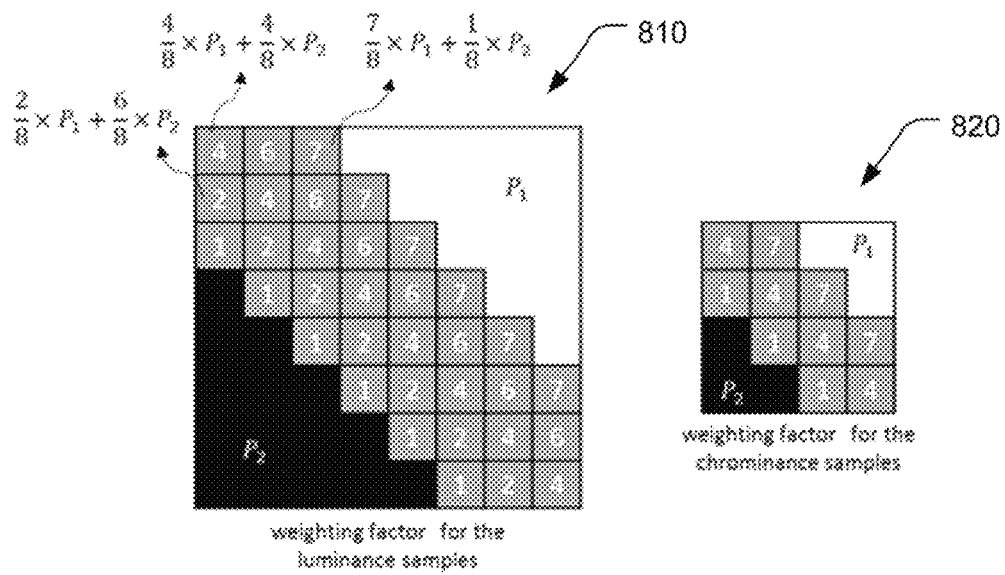
FIG. 8 illustrates an example of weighting for the luma block and weighting for the chroma block.
Figure 9:
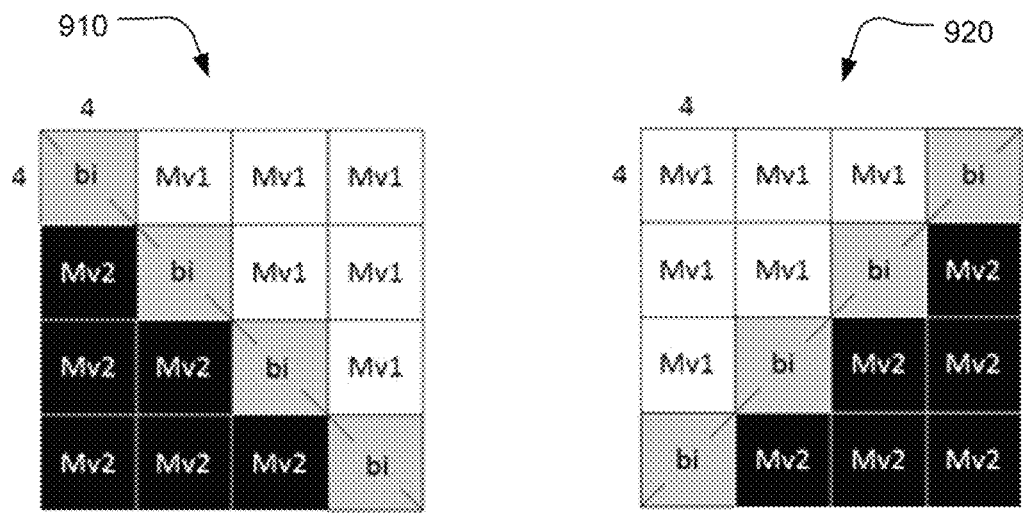
FIG. 9 illustrates an example of motion vector storage, where motion vectors (MV1 and Mv2) of the triangular prediction units are stored in 4×4 grids for diagonal partition and inverse diagonal partition.
Figure 10A:
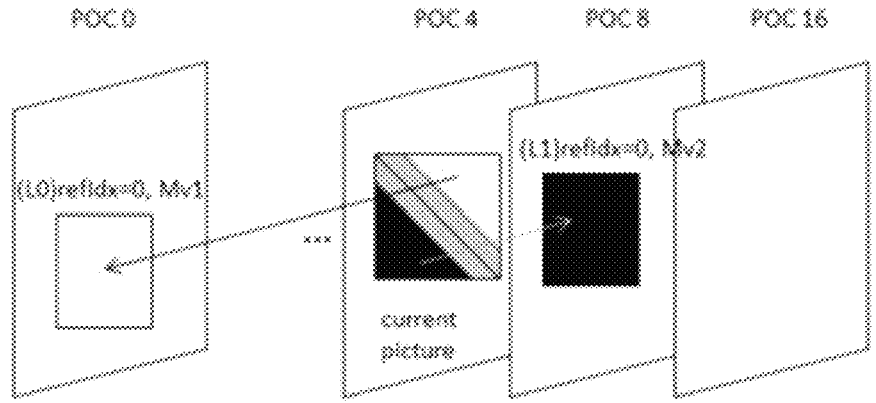
FIG. 10A-FIG. 10D illustrate examples of bi-prediction motion vector derivation according to JVET-L0124.
Figure 10B:
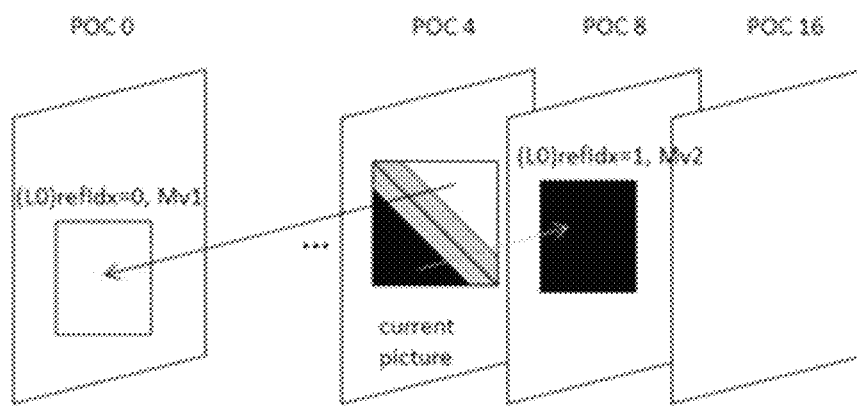
Figure 10C:
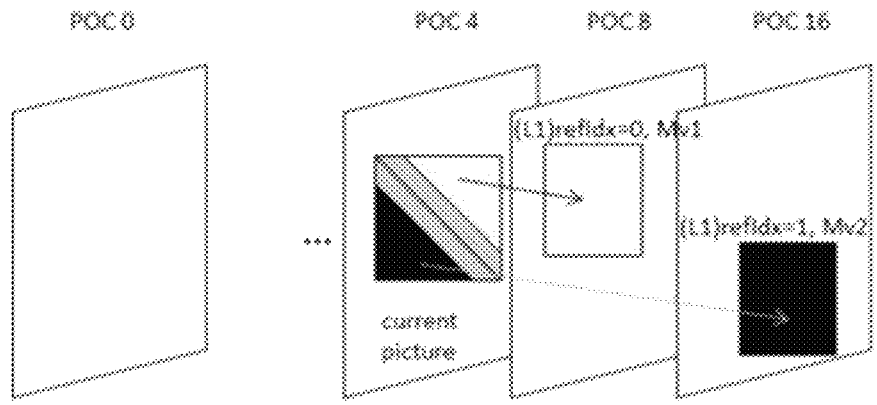
Figure 10D:
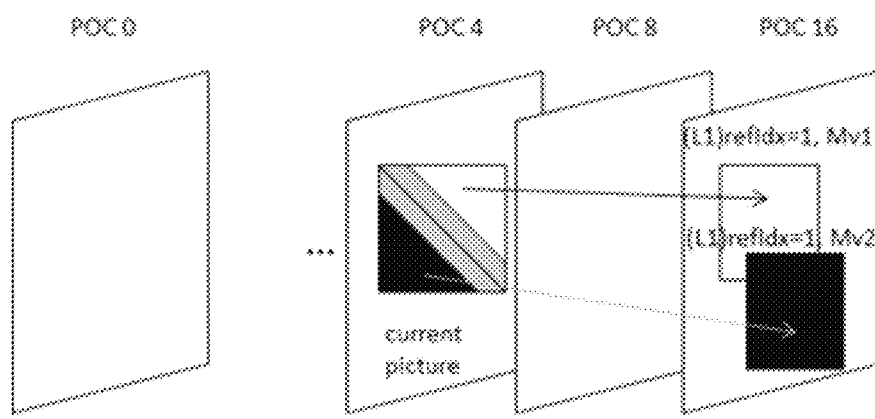

The following description is of the best-contemplated mode of carrying out the invention. This description is made for the purpose of illustrating the general principles of the invention and should not be taken in a limiting sense. The scope of the invention is best determined by reference to the appended claims.

Conditionally Signalling New Merge Tools with CPR

In HEVC SCC extension, if CPR mode is enabled for I slice, this I slice will be coded as an Inter slice. To make the integration of CPR and Merge mode better, several methods are proposed in this invention.

In one embodiment, if the CPR mode is used and there is no other Inter reference pictures, such as all the reference pictures being the current picture or only one reference picture which is current picture, the sub-block Inter mode is disabled. In syntax design, the sub-block Inter mode syntax is not signalled. For example, sub-block Inter mode flag is inferred as false. In another embodiment, the sub-block Inter mode syntax is constrained to disable the sub-block Inter mode (e.g. sub-block Inter mode flag is constrained to be false, it is a bitstream conformance requirement that the sub-block mode flag shall be false). The sub-block Inter mode constraint is applied in Skip mode and Merge mode. In another embodiment, when sub-block Inter mode can be supported in CPR (e.g. if the CPR mode is used and there is no other Inter reference pictures, or the selected reference picture is the current picture), the derived motion vector of each subblock is also rounded to be integer MVs.

In another embodiment, if the CPR mode is used and there is no other Inter reference pictures (e.g. all the reference pictures are the current picture or there is only one reference picture which is the current picture), the multi-hypothesis prediction mode (MH) is disabled. In syntax design, the MH mode syntax is not signalled (e.g. MH mode flag is inferred as false), or the MH mode syntax is constrained to disable the MH mode (e.g. MH mode flag is constrained to be false, it is a bitstream conformance requirement that the MH mode flag shall be false). In another embodiment, MH can use Merge candidates with IBC Merge type (e.g. MRG_TYPE_IBC) as one of the combined predictors.

In another embodiment, if the CPR mode is used and there is no other Inter reference pictures (e.g. all the reference pictures are the current picture or there is only one reference picture which is the current picture), the triangular prediction unit mode is disabled. In syntax design, the triangular prediction unit mode syntax is not signalled (e.g. triangular prediction unit mode flag is inferred as false), or the triangular prediction unit mode syntax is constrained to disable the triangular prediction unit mode (e.g. triangular prediction unit mode flag is constrained to be false, it is a bitstream conformance requirement that the triangular prediction unit mode flag shall be false). In another embodiment, the triangular prediction unit mode can be combined with CPR mode. For example, only one triangular prediction unit can be coded as CPR mode, or both triangular prediction units coded as CPR mode are valid.

In another embodiment, if the CPR mode is used and there is no other Inter reference pictures (e.g. all the reference pictures are the current picture or there is only one reference picture which is the current picture), the Merge with MVD mode (MMVD) is disabled. In syntax design, the MMVD mode syntax is not signalled (e.g. MMVD mode flag is inferred as false), or the MMVD mode syntax is constrained to disable the MMVD mode (e.g. MMVD mode flag is constrained to be false, it is a bitstream conformance requirement that the MMVD mode flag shall be false).

Applying MMVD with CPR

MMVD is considered in Skip mode coding or Merge mode coding in the current design. It will only be signalled if Merge flag or Skip flag is enabled. The concept of MMVD is to extend existing MVs to increase MV's diversity in Merge candidate list. Firstly, K MVs in Merge candidate list is selected as MMVD's expansions. The value of K is an integer larger than zero. Only Merge candidates with default Merge type (MRG_TYPE_DEFAULT_N) can be selected as MMVD's expansion. When CPR and MMVD are both enabled, Merge candidates with IBC Merge type (e.g. MRG_ TYPE_IBC) or default Merge type (MRG_TYPE_DEFAULT_N) is used as valid MMVD's expansions according to embodiments of the present invention.

In one embodiment, if a Merge candidate with IBC Merge type (e.g. MRG_TYPE_IBC) which means that the Merge candidate is coded by CPR is selected, the final MV (MMVD's expansion+MVD) will be rounded to integer MVs even if the MV after MMVD process is one fractional-pel MV. In another embodiment, after selecting a Merge candidate as an MMVD's expansion, only integer-pel MVD can be used to generate MMVD candidates. In this way, fractional-pel MVD does not need to be signalled. Therefore, one less code word will be used for MV steps coding. In another embodiment, if a Merge candidate with IBC Merge type (e.g. MRG_TYPE_IBC) is selected, then the MVD steps are increased by one ratio to make MVD as integer values. In another embodiment, if a Merge candidate with IBC Merge type (e.g. MRG_TYPE_IBC) is selected, one condition to check the legality of MVs in CPR mode is performed for each candidate. In one example, only legal candidates can be inserted into MMVD candidate list and the corresponding code word is changed. In another example, all candidates can be inserted into MMVD candidate list, but only those legal candidates can be selected at the encoder. The legality means that the MV constraints in CPR mode should be satisfied. The MV constraint is that the reference block pointed by MV needs to be in the current CTU, or the current CTU row, or the referenced block points by a block vector cannot be overlapped with current block or outside picture boundary, or outside wavefront parallel process (WPP).

To make the integration of CPR and other tools (e.g. MMVD, Pair-wise averaged Merge mode, and AMVR)

better, several methods are proposed in this invention. Furthermore, we also consider dual-tree coding with the integration in this invention.

CPR with Pairwise Averaged Merge Candidates

In one embodiment, if all the source candidates are CPR MVPs or one is CPR MVP and the other one is normal MVP, the averaged candidate is also a valid CPR candidate or a valid normal candidate.

For example, the source MVPs of two candidates for a reference picture list can be both CPR MVPs, CPR MVP and normal MVP, CPR MVP and invalid MVP, and both invalid MVPs. If both MVPs are CPR MVPs, the averaged MVP is also a CPR MVP and the averaged MV is calculated by averaging two CPR MVs; if one MVP is CPR MVP and the other one is normal MVP, one of the reference index and MV can be directly used without doing the average for the averaged MVP, and the reference index and MV of the candidates with the smallest (or largest) Merge (or reference) index are selected. Or one of the reference index of the candidates with the smallest (or largest) Merge (or reference) index can be directly selected, and the averaged MV is calculated by averaging two MVs directly; if one MVP is CPR MVP and the other one is invalid MVP, the averaged MVP is also a CPR MVP and the averaged MV is the only valid CPR MVP from two MVPs; if both MVPs are invalid MVPs, the averaged MVP are also invalid MVP. For a pairwise averaged merge candidate, if one of the two MVPs are CPR MVP then the averaged Merge candidate is considered as a CPR Merge candidate. If the pairwise averaged Merge candidate is a CPR MVP/candidate, the MV is required to be integer MV. The averaged MV is rounded to be an integer MV.

Conditionally Signalling New Merge Tools with CPR

In one embodiment, if the CPR mode is used and there is no other Inter reference pictures (e.g. all the reference pictures are the current picture or there is only one reference picture which is current picture or it is a IRAP), the sub-block Inter mode is disabled. In syntax design, the sub-block Inter mode syntax is not signalled (e.g. sub-block Inter mode flag is inferred as false). In another embodiment, the sub-block Inter mode syntax is constrained to disable the sub-block Inter mode (e.g. sub-block Inter mode flag is constrained to be false, it is a bitstream conformance requirement that the sub-block mode flag shall be false). The sub-block Inter mode constraint is applied in skip mode and Merge mode. In another embodiment, when sub-block Inter mode can be supported in CPR (e.g. if the CPR mode is used and there is no other Inter reference pictures, or the selected reference picture is the current picture or it is an TRAP), the derived motion vector of each subblock is also rounded to be integer MVs.

In another embodiment, if the CPR mode is used and there is no other Inter reference pictures (e.g. all the reference pictures are the current picture or there is only one reference picture which is the current picture or it is an IRAP), the multi-hypothesis prediction mode (MH) is disabled. In syntax design, the MH mode syntax is not signalled (e.g. MH mode flag is inferred as false), or the MH mode syntax is constrained to disable the MH mode (e.g. MH mode flag is constrained to be false, it is a bitstream conformance requirement that the MH mode flag shall be false). In another embodiment, MH can use Merge candidates with IBC Merge type (e.g. MRG_TYPE_IBC) as one of the combined predictors.

In another embodiment, if the CPR mode is used and there is no other Inter reference pictures (e.g. all the reference pictures are the current picture or there is only one reference picture which is the current picture or it is an IRAP), the triangular prediction unit mode is disabled. In syntax design, the triangular prediction unit mode syntax is not signalled (e.g. triangular prediction unit mode flag is inferred as false), or the triangular prediction unit mode syntax is constrained to disable the triangular prediction unit mode (e.g. triangular prediction unit mode flag is constrained to be false, it is a bitstream conformance requirement that the triangular prediction unit mode flag shall be false). In another embodiment, the triangular prediction unit mode can be combined with CPR mode. For example, only one triangular prediction unit can be coded as CPR mode, or both triangular prediction units coded as CPR mode are valid.

In another embodiment, if the CPR mode is used and there is no other Inter reference pictures (e.g. all the reference pictures are the current picture or there is only one reference picture which is the current picture or it is an IRAP), the Merge with MVD mode (MMVD) is disabled. In syntax design, the MMVD mode syntax is not signalled (e.g. MMVD mode flag is inferred as false), or the MMVD mode syntax is constrained to disable the MMVD mode (e.g. MMVD mode flag is constrained to be false, it is a bitstream conformance requirement that the MMVD mode flag shall be false).

Modified MMVD for Bandwidth Reduction Constraint

MMVD is considered in Skip mode coding or Merge mode coding in the present invention. It will only be signalled if Merge flag or Skip flag is enabled. The concept of MMVD is to extend existing MVs to increase MV's diversity in Merge candidate list. Firstly, K MVs in Merge candidate list are selected as MMVD's expansions. The value of K is a positive integer. According to embodiments of the present invention, only Merge candidates with default Merge type (MRG_TYPE_DEFAULT_N) can be selected as MMVD's expansion. However, if no Merge candidate with valid Merge type or no enough Merge candidates with valid Merge type exists in Merge candidate list, a default MV will be inserted into MMVD's expansion list and an MV (e.g. (0, 0)) with bi-prediction is always used as a default MV. We propose to consider current CU's prediction direction or slice/tile-type to insert a default MV. For example, if bi-prediction is allowed for the current CU or the current slice is B-slice or the current tile type is B-type tile, a default MV referred from either List 0 or List 1 List 0 and List 1 will be inserted to MMVD's expansion list. In another example, if bi-prediction is not allowed for the current slice (e.g. the current slice is P-slice or the current tile is P-type tile), a default MV referred from List 0 or List 1 will be inserted to MMVD's expansion list. For example, if the current slice is a P-slice, a default MV (e.g. (0, 0)) referred from List 0 (e.g. with reference index equal to 0) will be inserted to MMVD's expansion list if valid candidate numbers is smaller than the maximum candidate number. For another example, if the current CU is a 4×4 block, a default MV (e.g. (0, 0)) referred from List 0 will be inserted to MMVD's expansion list if the number of valid candidates is smaller than the maximum candidate number.

Bi-prediction for some smaller block sizes (for example, 4×4 block or any other smaller block size) may lead to issues raised by worst-case memory bandwidth. To reduce bandwidth overhead, we can convert a bi-prediction Merge candidate into a uni-prediction Merge candidate in at least one default block size (for example, some smaller block size like a 4×4 block) in the current codebase. In the current design, a normal Merge candidate list will be generated firstly, and then a bi-prediction checking will be applied if a current block is a 4×4 block. In this condition, all bi-prediction Merge candidates will be converted to uni-prediction Merge candidates with reference frames from list 0. The converted uni-prediction Merge candidates are used to generate the MMVD candidates. However, if the available candidate number is not enough, the bi-prediction zero MVs are inserted as the MMVD base candidate. It will result in bi-prediction motion compensation for the 4×4 block. In one embodiment, we propose to apply the bi-prediction checking in each 4×4 block after all Merge candidates (including a normal Merge candidate, MMVD, and HM Merge candidate) are generated. In this way, all Merge candidates (e.g. normal Merge candidates, MMVD, HM, history based Merge candidates) will be guaranteed to be a uni-prediction Merge candidates if a current block is a 4×4 block. In some other embodiments, the current invention can also apply to some other Merge candidates (for example, a pairwise average Merge candidate or any other merge candidate), which should not be limited in this disclosure.

CPR with Adaptive Motion Resolution

If adaptive motion resolution for List 0 or List 1 or both List 0 and List 1 is enable, and is signalled before reference picture index, the reference picture index needs to be signalled or parsed for List 0 or List 1 or both List 0 and List 1.

If the reference picture index for List 0 or List 1 or both List 0 and List 1 is signalled before the integer MV flag, and the reference picture for List 0 or List 1 or both List 0 and List 1 is equal to the current picture, the integer MV flag is inferred as true. Therefore, integer MV flag needs not to be signalled or parsed for List 0 or List 1 or both List 0 and List 1. In another example, if the reference picture index for List 0 or List 1 or both List 0 and List 1 is signalled before the integer MV flag, the reference picture for List 0 or List 1 or both List 0 and List 1 is equal to the current picture, and not all MVD are equal to 0, the integer MV flag is inferred as true. In one embodiment, the 4-pel integer MV mode is adopted as one of the integer MV mode. An integer MV index (imv_idx) is signalled. When the imv_idx is 0, the fractional MV (e.g. quarter MV) is used; when the imv_idx is 1, the integer MV is used; when the imv_idx is 2, the 4-pel MV is used. If the reference picture index for List 0 or List 1 or both List 0 and List 1 is signalled before the integer MV flag, and the reference picture for List 0 or List 1 or both List 0 and List 1 is equal to the current picture, the imv_idx can only be greater than 0 (e.g. the imv_idx equal to 1 or 2). In one example, one bin is signalled to indicate whether the imv_idx should be equal to 1 or 2. In another embodiment, if the reference picture index for List 0 or List 1 or both List 0 and List 1 is signalled before the integer MV flag, the reference picture for List 0 or List 1 or both List 0 and List 1 is equal to the current picture, and not all MVD are equal to 0, the imv_idx can only be greater than 0.

However, in some embodiments, if the reference picture index is signalled before the integer MV flag, the reference picture is equal to the current picture, and the MVD in List 0 or List 1 or both List 0 and List 1 is equal to zero, then the integer MV flag in List 0 or List 1 or both List 0 and List 1 is inferred as false (or the imv_idx is inferred as 0), and the integer MV flag needs not to be signalled or parsed, either.

In other words, if the integer MV flag is false in List 0 or List 1 or both List 0 and List 1, and the reference picture in List 0 or List 1 or both List 0 and List 1 is equal to the current picture, it implies that the MVD for the target reference picture is equal to zero. In another embodiment, the integer MV flag is inferred as false (or the imv_idx is inferred as 0) only when MVDs are zero in List 0, List 1, or both List 0 and List 1 and the selected reference picture is not equal to the current picture; the integer MV flag is inferred as true (or the imv_idx can only be greater than 0) when the selected reference picture is equal to the current picture, regardless of MVDs.

CPR can also be enabled with bi-prediction. In this case, both List 0 and List 1 may have the current picture as a reference picture. In one embodiment, if the reference picture index is signalled before the integer MV flag or the integer MV index, and both side of the reference pictures are equal to the current picture (e.g. the MVDs do not need to be all zero), then the integer MV flag is inferred as true or the integer MV index shall be larger than 0. Otherwise, if the reference picture index is signalled before the integer MV flag or the integer MV index, and only one side of the reference picture is equal to the current picture (e.g. the MVDs do not need to be all zero), then the integer MV flag is needed to be signalled or parsed. In one embodiment, if the reference picture index is signalled before the integer MV flag or the integer MV index, and one side of the reference pictures, either from List 0 or List 1, is equal to the current picture (e.g. the MVDs do not need to be all zero), then the integer MV flag or the integer MV index is inferred as true or the integer MV index shall be larger than 0; an MV referred from a reference picture other than the current picture will be rounded to integer precision. In another embodiment, if the reference picture index is signalled before the integer MV flag or the integer MV index, both side of the reference pictures are not equal to the current picture, and the MVD in List 0 or List 1 or both List 0 and List 1 is equal to zero, then the integer MV flag in List 0 or List 1 or both List 0 and List 1 is inferred as false or the integer MV index is inferred as 0, and the integer MV flag needs not to be signalled or parsed. In one embodiment, to ensure that an MV with the reference picture equal to the current picture will be coded by integer resolution, a MVD will be decoded by integer resolution regardless of the integer MV flag or when the integer MV index is 0 if the reference picture is equal to current picture. In another embodiment, the MVD resolution depends on the integer MV flag (or integer MV index) and whether the referenced picture is current picture. If the referenced picture is not the current picture, the MVD resolution depends on the integer MV flag (or integer MV index). If the referenced picture is the current picture, the MVD resolution is integer MV resolution or other MV resolution that are not fractional resolution (e.g. 4-pel resolution) according to the integer MV index. For example, if the referenced picture is the current picture and the imv_idx is 0 or 1, the MVD resolution is integer MV resolution. If the imv_idx is 2, the MVD resolution is 4-pel integer MV resolution. In another embodiment, if the reference picture is equal to the current picture, its MV will not always be stored by fractional-luma sample, an appropriate resolution (e.g. integer-luma sample) will be used to code this MV. In this case, it will be decoded as an integer MV, either with integer resolution or 4-pel resolution regardless of the integer MV flag.

CPR with Temporal MVs from Collocated Pictures

According to embodiments of the present invention, there are some conditions that an MV cannot be a valid temporal MV for Merge mode or Inter mode MVP generation. Furthermore, if CPR is enabled, a current picture will be used a reference picture, and a current picture is usually placed in the last position of List 0. The referenced current is marked as a long-term reference picture. In one example, if a current picture refers to a picture equal to itself (i.e., the current picture), the MV cannot be used as a collocated MV for temporal Merge candidate or Inter mode MVP generation. In another example, if the current picture refers to a long-term picture, but the collocated picture doesn't reference to a long-term picture, the collocated picture's MV cannot be used as a temporal MV for the current picture. In another case, if current picture references to a short-term picture, but the collocated picture references to a long-term picture, the collocated picture's MV cannot be used a temporal MV for current picture either. We propose to relax the temporal MV's constraints.

In one embodiment, if a current picture refers to a picture equal to itself (i.e., refPOC equal to curPOC), and a collocated picture also refers to a picture equal to the collocated picture (i.e., refPOC equal to curPOC), this temporal MV from the collocated picture is valid for the current picture's Merge mode and MVP generation. The MV can be used with or without scaling and the reference picture is set equal to the current picture. In another embodiment, if a current picture refers to a picture equal to itself (i.e., refPOC equal to curPOC), and a collocated picture refers to a long-term picture other than the current picture, the temporal MV from the collocated picture can also be used for the current picture's Merge mode and MVP generation. But a precision checking needs to be applied after referring. If the temporal MV from the collocated picture is coded with a fraction-luma sample, it needs to be rounded to an integer-luma sample. In another embodiment, if a current picture refers to a picture equal to itself (i.e., refPOC equal to curPOC), and a collocated picture refers to a long-term picture other than the current picture, the temporal MV from the collocated picture can be used for the current picture either in Merge mode and MVP generation only when the temporal MV from the collocated picture is coded with an integer-luma sample. In another embodiment, if a current picture refers to a picture equal to itself (i.e., refPOC equal to curPOC), and a collocated picture refers to a long-term picture other than the current picture, the temporal MV from the collocated picture cannot be used for the current picture either in Merge mode and MVP generation.

In another embodiment, if a current picture refers to a picture equal to itself (i.e., refPOC equal to curPOC), and a collocated picture also refers to a picture equal to itself (i.e., refPOC equal to curPOC), the MV from collocated picture can used as a temporal MV for the current picture with its reference picture index equal to the current picture. In another embodiment, if a current picture refers to a picture equal to itself (i.e., refPOC equal to curPOC), and a collocated picture also refers to a picture equal to itself (i.e., refPOC equal to curPOC), a temporal MV which is not marked as a CPR type Merge candidate can be derived according to the temporal MV from the collocated picture. The derived temporal MV points to a reference block in reference picture with the reference index equal to the collocated picture.

In another embodiment, when the reference picture of the current picture and the reference picture of the collocated picture are all long-term reference picture, whether the collocated MV can be used or not depends on whether the reference picture is the current picture (or the current picture of the collocated picture) or not. For example, if both reference are long-term pictures other than the current picture, the collocated MV is valid. If one of the reference picture is the current picture (or the current picture of the collocated picture), and the other reference picture is the long-term picture other than the current picture, the collocated MV is not valid. If both references are long-term pictures and are the current picture and the current picture of the collocated picture, the collocated MV is also valid. The derived temporal MV points to the current picture.

CPR with Sub-Block Merge Mode and Affine AMVP

In the previous invention, sub-block Merge mode includes affine Merge and ATMVP mode and affine AMVP mode is proposed. However, after applying the CPR design, several methods are proposed to improve the integration. In one embodiment, if sub-block Merge mode or affine AMVP mode is enabled, and the reference picture of current picture is equal to the current picture, an MV checking process is needed after MV derivation. All sub-block MVs need to be integer MVs. In another embodiment, if the current picture is allowed to be referred to the current CU, no matter which prediction mode is selected (e.g. normal Merge mode, MH mode, triangular Merge mode, MMVD Merge mode, Inter mode, AMVP mode, sub-block Merge mode, affine AMVP mode, etc.), the MV for the current block or the current sub-blocks needs to be coded with integer resolution. An MV checking process is needed after different mode's MV derivation process. If the reference picture of the current CU is equal to the current picture, a fractional MV for current block or current sub-block needs to be transformed into integer resolution.

Control Syntax for Coding Tool Management

In VTM-4.0 MMVD, sps_fpel_mmvd_enabled_flag is used to disable the fractional offset of MMVD. When sps_fpel_mmvd_enabled_flag is enabled, a fractional offset will not be allowed to be added as an MVD.

In this disclosure, it is proposed to use a control flag or syntax that signalled in a tile/tile-group/picture/slice/sequence/APS-level. When this flag or syntax is true, one or more coding tool is modified in a target mode that is different from other mode when this flag/syntax is false. The coding tool can be MMVD, AMVR, DMVR, Intra prediction, or any of the combination above. In one example, when the flag or syntax is true, the fraction offset is not allowed to be added as an MVD. In another example, when this flag or syntax is enabled, the amvr_flag will not need to be signalled and will be inferred as true. Only amvr_idx is needed to be signalled to indicate whether 4-pel MV resolution is used or not. In another example, when this flag or syntax is enabled, the MVD is only coded in integer pel or 4-pel precision. The quarter or half sample precision is disabled. In another embodiment, when this flag or syntax is enabled, the Intra interpolation will be disabled. The integer sample Intra pixel copy is used. In another embodiment, when this flag or syntax is enabled, fractional DMVR refinement will be disabled. In another embodiment, when this flag or syntax is enabled, more than one coding tools will be disabled. For example, amvr_flag and/or the Intra interpolation can be both disabled.

Any of the foregoing proposed methods can be implemented in encoders and/or decoders. For example, any of the proposed methods can be implemented in Inter coding module/processor/program codes of an encoder, and/or a decoder. Alternatively, any of the proposed methods can be implemented as a circuit coupled to the Inter coding of the encoder and/or the decoder, so as to provide the information needed by the Inter coding.

Figure 11:
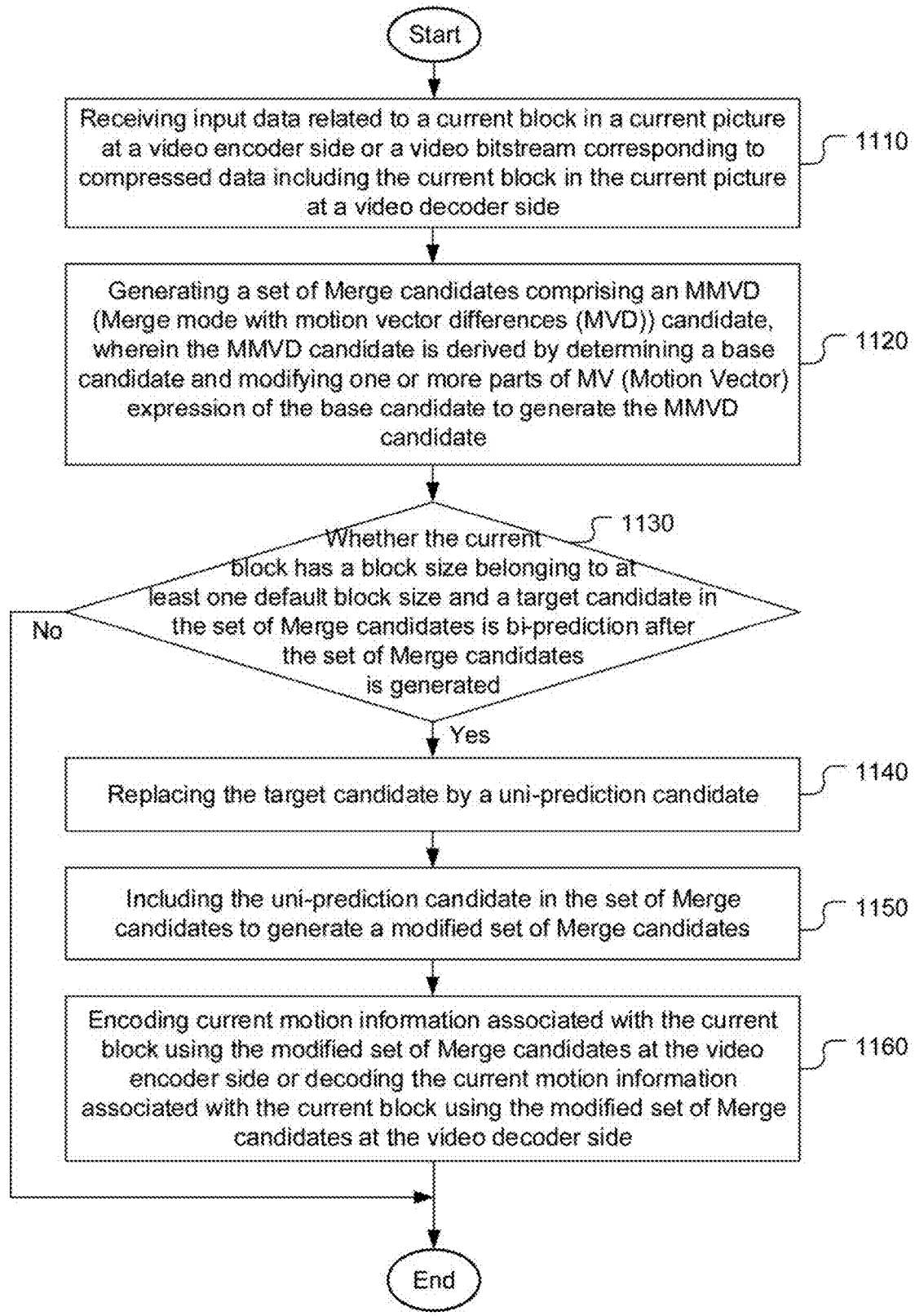
FIG. 11 illustrates a flowchart of an exemplary prediction for video coding according to an embodiment of the present invention.

FIG. 11 illustrates a flowchart of an exemplary prediction for video coding according to an embodiment of the present invention. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, input data related to a current block in a current picture are received at a video encoder side or a video bitstream corresponding to compressed data including the current block in the current picture are received at a video decoder side in step 1110. A set of Merge candidates comprising an MMVD (Merge mode with motion vector differences (MVD)) candidate is generated in step 1120, wherein the MMVD candidate is derived by determining a base candidate and modifying one or more parts of MV (Motion Vector) expression of the base candidate to generate the MMVD candidate. In step 1130, it determines whether the current block has a block size belonging to at least one default block size and a target candidate in the set of Merge candidates is bi-prediction after the set of Merge candidates is generated. If the current block has a block size belonging to at least one default block size and the target candidate is bi-prediction (i.e., the "Yes" path from step 1130), steps 1140 to 1160 are performed. Otherwise (i.e., the "no" path), steps 1140 to 1160 are skipped. In step 1140, the target candidate is replaced by a uni-prediction candidate. In step 1150, including the uni-prediction candidate is included in the set of Merge candidates to generate a modified set of Merge candidates. In step 1160, current motion information associated with the current block is encoded using the modified set of Merge candidates at the video encoder side or the current motion information associated with the current block is decoded using the modified set of Merge candidates at the video decoder side.

The flowcharts shown are intended to illustrate examples of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of prediction for video coding, the method comprising:
    receiving input data related to a current block in a current picture at a video encoder side or a video bitstream corresponding to compressed data including the current block in the current picture at a video decoder side;
    generating a set of Merge candidates comprising an MMVD (Merge mode with motion vector differences (MVD)) candidate, wherein the MMVD candidate is derived by determining a base candidate and modifying one or more parts of MV (Motion Vector) expression of the base candidate to generate the MMVD candidate;
    if the current block has a block size belonging to at least one default block size and a target candidate in the set of Merge candidates is bi-prediction after the set of Merge candidates is generated:
    replacing the target candidate by a uni-prediction candidate; and
    encoding current motion information associated with the current block using the uni-prediction candidate at the video encoder side or decoding the current motion information associated with the current block using the uni-prediction candidate at the video decoder side.

2. The method of claim 1, wherein the at least one default block size comprises 4×4.

3. The method of claim 1, wherein the set of Merge candidates further comprises a normal Merge candidate or a pairwise average Merge candidate.

4. The method of claim 1, wherein the set of Merge candidates further comprises a history-based Merge candidate.

5. The method of claim 1, wherein the base candidate is only selected from first Merge candidates in the set of Merge candidates with a default Merge type.

6. The method of claim 5, wherein if none of the set of Merge candidates has the default Merge type, a default MV is included in modified set of Merge candidates.

7. The method of claim 6, wherein the default MV is referred from a reference picture in reference picture List 0.

8. The method of claim 1, wherein said one or more parts of MV expression comprise prediction direction information, starting point, motion magnitude, motion direction, or a combination thereof associated with the MV expression.

9. An apparatus of Inter prediction for video coding, the apparatus of Inter prediction for video coding comprising one or more electronic circuits or processors arranged to:
- receive input data related to a current block in a current picture at a video encoder side or a video bitstream corresponding to compressed data including the current block in the current picture at a video decoder side;
- generate a set of Merge candidates comprising an MMVD (Merge mode with motion vector differences (MVD)) candidate, wherein the MMVD candidate is derived by determining a base candidate and modifying one or more parts of MV (Motion Vector) expression of the base candidate to generate the MMVD candidate;
- if the current block has a block size belonging to at least one default block and a target candidate in the set of Merge candidates is bi-prediction after the set of Merge candidates is generated:
  - replace the target candidate by a uni-prediction candidate; and
  - encode current motion information associated with the current block using the uni-prediction candidate at the video encoder side or decode the current motion information associated with the current block using the uni-prediction candidate at the video decoder side.

* * * * *